United States Patent
Trocke et al.

(10) Patent No.: US 10,367,260 B1
(45) Date of Patent: Jul. 30, 2019

(54) DYNAMIC REDUCTION OF CURRENT DRAIN FOR ANTENNA TUNER OF A COMMUNICATION DEVICE

(71) Applicant: MOTOROLA MOBILITY LLC, Chicago, IL (US)

(72) Inventors: Robert S. Trocke, Caledonia, WI (US); Ranjeet Gupta, Naperville, IL (US); Mary Khun Hor-Lao, Chicago, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 15/866,277

(22) Filed: Jan. 9, 2018

(51) Int. Cl.
| | |
|---|---|
| *H04B 1/40* | (2015.01) |
| *H01Q 1/52* | (2006.01) |
| *H04W 76/16* | (2018.01) |
| *H01Q 21/28* | (2006.01) |
| *H01Q 1/24* | (2006.01) |
| *H01Q 5/371* | (2015.01) |

(52) U.S. Cl.
CPC ............ *H01Q 1/523* (2013.01); *H01Q 1/243* (2013.01); *H01Q 5/371* (2015.01); *H01Q 21/28* (2013.01); *H04W 76/16* (2018.02)

(58) Field of Classification Search
CPC ...... H04W 4/008; H04W 76/00; H04B 1/005; H04B 1/0064; H04B 2001/1072; H04B 1/401
See application file for complete search history.

(56) References Cited

U.S. PATENT DOCUMENTS

| | | | |
|---|---|---|---|
| 2010/0008338 A1* | 1/2010 | Tsfati | H04B 1/006 370/338 |
| 2015/0048979 A1* | 2/2015 | Asrani | H01Q 1/243 343/702 |

OTHER PUBLICATIONS

Boyle, K.R., et al., "A Self-Contained Adaptive Antenna Tuner for Mobile Phones", 6th European Conference on Antennas and Propagation (EUCAP) 2012.

de Mingo, Jesus, et al., "An RF Electronically Controlled Impedance Tuning Network Design and Its Application to an Antenna Input Impedance Automatic Matching System", IEEE Transactions on Microwave Theory and Techniques< vol. 52, No. 2, pp. 489-497, Feb. 2004.

(Continued)

*Primary Examiner* — Tuan Pham
(74) *Attorney, Agent, or Firm* — Yudell Isidore PLLC

(57) ABSTRACT

A communication device, method and computer program product provide improved performance of one radio frequency (RF) conduction path using an antenna tuner of another RF conduction path while dynamically reducing current drain by the antenna tuner. A determination is made that a first RF conduction path is active in using a first portion of a multiple band antenna system for at least one of: (i) transmitting; and (ii) receiving a signal. An antenna tuner of a second RF conduction path that uses a second portion of the multiple band antenna system is activated. The antenna tuner is configured to tune the second portion of the multiple band antenna system to isolate the second portion from the first portion used by the first RF conduction path. The antenna tuner is deactivated in response to determining that both the first and second RF conduction paths are inactive.

20 Claims, 7 Drawing Sheets

(56) References Cited

OTHER PUBLICATIONS

Pan, Helen K., et al., "Reconfigurable Antenna Implementation in Multi-radio Platform", 2008 IEEE Antennas and Propagation Society International Symposium.
Papapolymerou, John et al., Reconfigurable Double-Stub Tuners Using MEMS Switches for Intelligent RF Front-Ends. IEEE Transaction on Microwave Theory and Techniques, vol. 51, No. 1, pp. 271-278, Jan. 2003.

\* cited by examiner

DYNAMIC REDUCTION OF CURRENT DRAIN FOR ANTENNA TUNER OF A COMMUNICATION DEVICE

BACKGROUND

1. Technical Field

The present disclosure relates generally to communication devices with, and more particularly to communication devices having active antenna tuning.

2. Description of the Related Art

Communication devices such as smartphones are capable of communicating via numerous protocols on many radio frequency (RF) bands. These protocols include: (i) Bluetooth (BT) connections; (ii) Global Positioning System (GPS); (iii) Personal Access Networks (PAN); (iv) Wireless Local Access Networks (WLAN) such as Wi-Fi; (v) Wireless Wide Area Networks (WWAN) such as 3rd Generation Partnership Project (3GPP) Long Term Evolution (LTE), etc. Even within specific protocols, multiple RF bands are used. For example, The IEEE 802.11 working group for WLAN standards currently documents use in five distinct frequency ranges: 2.4 GHz, 3.6 GHz, 4.9 GHz, 5 GHz, and 5.9 GHz bands. However, communication devices intended for handheld use have size and battery limitations. Incorporating antennas that are tuned to all of the particular bands is difficult under such restraints. Active antenna tuning becomes necessary in order to provide antenna radiation efficiency. Antenna tuning is now standard in mid and high tier smartphones and soon will become standard in low tier smartphones.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
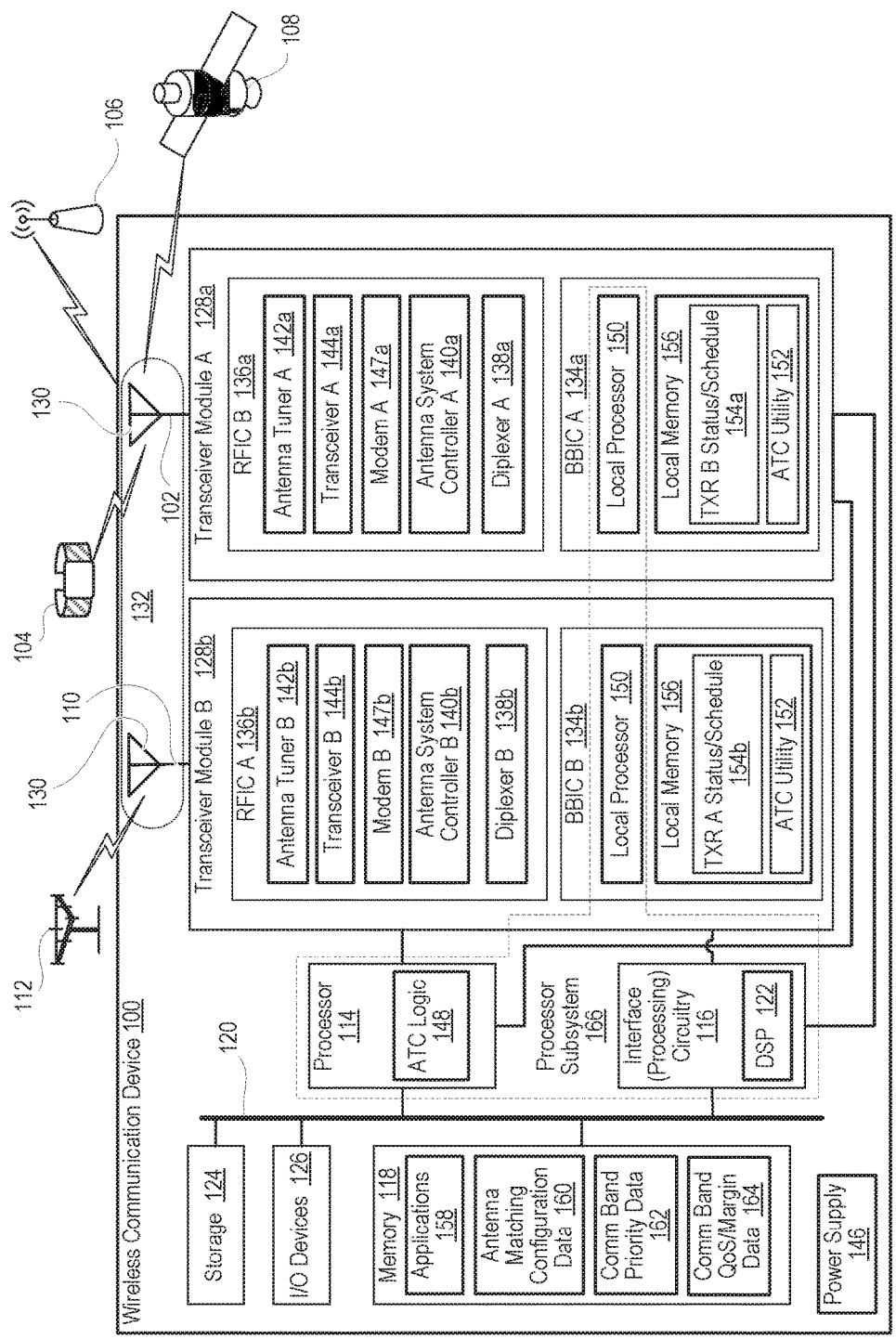
FIG. 1 illustrates a functional block diagram of an example portable communication device within which certain of the functional aspects of the described embodiments may be implemented.

According to aspects of the present innovation, a communication device transmits and receives ("tranceives") according to multiple communication protocols using various front end (FE) and radio frequency (RF) components. The disclosure provides a method and system for selectively activating an antenna tuner that directly tunes one portion of the multiple band antenna system when helpful, which can provide a benefit to the other portion of the multiple band antenna system. As another aspect of the disclosure, the antenna tuner is turned off when otherwise not beneficial, in order to reduce current drain.

To efficiently transceive, antenna tuning can match impedances between an antenna feed line and the antenna. Due to close proximity of certain elements of a multiple band antenna system of certain communication devices, antenna tuning of one portion of the multiple band antenna system can indirectly affect efficiency of another portion of the multiple band antenna system. In some implementations, wireless wide area access network (WWAN) communication can be provided on a secondary RF conduction path with active antenna tuning. When WWAN is inactive, it is often beneficial to optimize the antenna tuner for indirectly improving performance of wireless local access network (WLAN), Bluetooth (BT), or global positioning system (GPS) performance on another RF conduction path. WLAN/BT may require only passive RF-FE components, such as filters and diplexers, for example, without an assigned active antenna tuner. The disclosure addresses the fact that existing control architectures are problematic for optimization of current drain of such active antenna tuning. With conventional systems, when antenna tuning is required for the WWAN signal, the modem and radio frequency front end (RF-FE) power supplies are already active. However, when the antenna tuner is required for connectivity radios or location services, the additional complexity and overhead of waking the WWAN modem and communicating the change of state of wireless local access network (WLAN) or Bluetooth (BT) transceiver is undesirable. This means that the antenna tuner devices, which typically must be enabled/disabled by commands over a digital interface, are left in the active state at all times and draw their full current drain. Activating the antenna tuner power supply means that any other RF-FE components that share an analog power supply with the antenna tuner will draw leakage current all the time, even if the corresponding RF conduction path is disabled. Thus, one aspect of the disclosure includes the recognition that selectively activating of the antenna tuner on an inactive RF conduction path to benefit another active RF conduction path can reduce current drain as compared to keeping the antenna tuner active when no RF conduction paths are active to benefit from tuning.

In one aspect of the present disclosure, a method includes determining that a first RF conduction path is active in using a first portion of a multiple band antenna system for at least one of: (i) transmitting; and (ii) receiving a signal. The method includes activating an antenna tuner of a second RF conduction path. The second RF conduction path uses a second portion of the multiple band antenna system. The method includes configuring the antenna tuner to tune the second portion of the multiple band antenna system to isolate the second portion from the first portion of the multiple band antenna system that is used by the first RF conduction path. The method includes deactivating the antenna tuner in response to determining that both the first and second RF conduction paths are inactive. Tuning only when the first RF conduction path is active achieves dynamic reduction of current drain of the antenna tuner.

According to one or more aspects of the present disclosure, a communication device includes a multiple band antenna system. A first RF conduction path is coupled to a first portion of the multiple band antenna system. A first transceiver is coupled to the first RF conduction path to at least one of: (i) transmit; and (ii) receive a signal via the first portion of the multiple band antenna system. A second RF conduction path is coupled to a second portion of the multiple band antenna system. A second transceiver is coupled to the second RF conduction path to at least one of: (i) transmit; and (ii) receive a next signal via the second portion of the multiple band antenna system. An antenna tuner is coupled to the second RF conduction path to tune the second portion of the multiple band antenna system. A modem is coupled to the antenna tuner to configure tuning of the second portion of the multiple band antenna system. A processor subsystem is in communication with the modem and executes an antenna tuning control utility. The antenna tuning control utility causes the processor subsystem to determine that the first RF conduction path is active in using the first portion of the multiple band antenna system for at least one of: (i) transmitting; and (ii) receiving the signal. The processor subsystem configures the antenna tuner, via the modem, to tune the second portion of the multiple band antenna system to isolate the second portion from the first portion used by the first RF conduction path and to achieve dynamic reduction of current drain for the antenna tuner.

According to one or more aspects of the present disclosure, a computer program product includes program code on a computer readable storage device. When executed by a processor associated with a communication device, the program code enables the communication device to provide the functionality of determining that a first radio frequency (RF) conduction path is active in using a first portion of a multiple band antenna system for at least one of: (i) transmitting; and (ii) receiving a signal. The program code further configures the device to perform the functionality of: activating an antenna tuner of a second RF conduction path that uses a second portion of the multiple band antenna system; configuring the antenna tuner to tune the second portion of the multiple band antenna system to isolate the second portion from the first portion used by the first RF conduction path, in order to achieve dynamic reduction of current drain by the antenna tuner of a communication device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

With specific reference now to FIG. 1, there is depicted a block diagram of an example wireless communication device 100, within which the functional aspects of the described embodiments may be implemented. Wireless communication device 100 represents a device that is adapted to transmit and receive RF signals over an air interface via uplink and/or downlink channels between the wireless communication device 100 and communication network equipment. In one or more embodiments, the wireless communication device 100 can be a mobile cellular device/phone or smartphone, or laptop, netbook or tablet computing device, or other types of communications devices. For clarity, FIG. 1 illustrates a first RF conduction path 102 of the wireless communication device 100 that communicates with one or more of a personal access network (PAN) device such as a smartphone 104 via a Bluetooth wireless link, a node 106 of a wireless local access network (WLAN), and a global positioning system (GPS) satellite 108. A second RF conduction path 106 of the wireless communication device 100 communicates with a base station 110 of a wireless wide area access network (WWAN). The second RF conduction path 110 can utilize a plurality of different communication standards, such as Global System for Mobile Communications (GSM) Code Division Multiple Access (CDMA), Orthogonal Frequency Division Multiple Access (OFDMA), and similar systems.

Wireless communication device 100 includes a processor 114 and interface (processing) circuitry 116, which are connected to memory 118 via an interconnect such as signal bus 120. Interface circuitry 116 includes digital signal processor (DSP) 122. The various hardware components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Wireless communication device 100 includes storage 124. Also illustrated within wireless communication device 100 are input/output (I/O) devices 126. Wireless communication device 100 also includes a first transceiver module "A" 128a for sending and receiving communication signals via the first RF conduction path 102. Wireless communication device 100 also includes a second transceiver module "B" 128b for sending and receiving communication signals via the second RF conduction path 110. In at least some embodiments, the sending and receiving of communication signals occur wirelessly and are facilitated by one or more antennas 130 of a multiple band antenna system 132 coupled to the transceiver modules 128a-128b. One antenna 130 can carry different RF bands or can be dedicated to one RF band. An antenna 130, or a portion of an antenna 130, can be dedicated to one of transmitting and receiving or can simultaneously or selectively transceive. Duplexers can isolate for simultaneous transceiving (not shown). An RF conduction path 102, 110 can be active for at least one of receiving and transmitting, including participating in time division duplexing (TDD), frequency division duplexing (FDD), etc.

FIG. 1 illustrates that each transceiver module 128a-128b includes a respective baseband integrated circuit (BBIC) 134a-134b and radio frequency integrated circuit (RFIC) 136a-136b. For clarity, functions are segregated between BBIC 134a-134b and RFIC 136a-136b. However, functions can be consolidated rather than being independent. In addition, BBIC 134a-134b are illustrated as having the same functions and RFIC 136a-136b are illustrated as having the same functions. However, in one or more embodiments, some functions may be omitted from a particular component. RFICs 136a-136b includes diplexers A, B 138a-138b respectively that provide isolation for sequential transmitting and receiving on the same RF conduction path 102, 110. RFICs 136a-136b include respective antenna system controllers A and B 140a-140b that control antenna tuners 142a-142b, and transceivers 144a-144b. For example, antenna system controllers A and B 140a-140b can selectively actively power antenna tuners 142a-142b, and transceivers 144a-144b, when needed, by a power supply 146, such as a power management integrated circuit (PMIC). Antenna system controllers A and B 140a-140b can control the respective antenna tuners 142a-142b to tune the respective portion of the multiple band antenna system 132 to radiate more effectively in a particular assigned RF band. In one or more embodiments, antenna system controllers A and B 140a-140b can control the respective antenna tuners 142a-142b to tune the assigned portion of the multiple band antenna system 132 to enhance performance of another portion of the multiple band antenna system 132 used by the other transceiver module 128a-128b. An antenna tuner is a device connected between a radio transmitter or receiver (transceivers 144a-144b) and an assigned portion of the multiple band antenna system 132 to improve power transfer by matching the impedance.

Transceivers A and B 144a-144b convert between a baseband signal provided by respective modems A and B 147a-147b and an RF signal. The baseband signal carries information that is encoded or decoded by the modems A and B 147a-147b. In one or more embodiments, modem (modulator-demodulator) is a network hardware device that modulates one or more carrier wave signals to encode digital information for transmission and demodulates signals to decode the received information. Demodulator can be implemented in hardware or software. The goal is to produce a signal that can be transmitted easily and decoded to reproduce the original digital data.

BBICs 134a-134b receive upper level control and data content for communication from antenna system control (ATC) logic 148 executed by the processor 114. In one or more embodiments, BBICs 134a-134b include local functionality provided by a respective local processor 150 that executes an ATC utility 152 in accordance with status or schedule information 154a-154b contained in local memory 156 about the other transceiver module 128a-128b.

Processor 114 can execute the ATC logic 148 in addition to applications 158 contained in memory 118 to enhance antenna performance while achieving dynamic reduction of current drain for the antenna tuners 142a-142b. ATC logic 148 can utilize information maintained in memory 118 for tuning portions of the multiple band antenna system 132. The information can include antenna matching configuration data 160, communication band priority data 162, and communication band quality of service (QoS)/antenna performance margin data 164. One or more of the processor 114, interface circuitry 116, and one of the local processors 150 (collectively "a processor subsystem" 166) can individually or in combination determine based on the status or schedule information 154a-154b that the benefits of tuning the respective portion of the multiple band antenna system 132 is warranted. The processor subsystem 166 can also determine that tuning is unwarranted and can avoid power consumption by the power supply 146.

During operation, processor subsystem 166 determines that the first RF conduction path 102 is active in using the first portion of the multiple band antenna system 132 for at least one of: (i) transmitting; and (ii) receiving the signal. Processor subsystem 166 configures, via the modem, the antenna tuner B 142b for the second RF conduction path 110 to tune the second portion of the multiple band antenna system 132 in order to isolate the second portion from the first portion used by the first RF conduction path 102. The tuning is achieved dynamically to reduce current drain for the antenna tuner 144b. When the first and second RF conduction paths 102, 110 are both not active, active tuning by the antenna tuner B 142b is not used.

Figure 2:
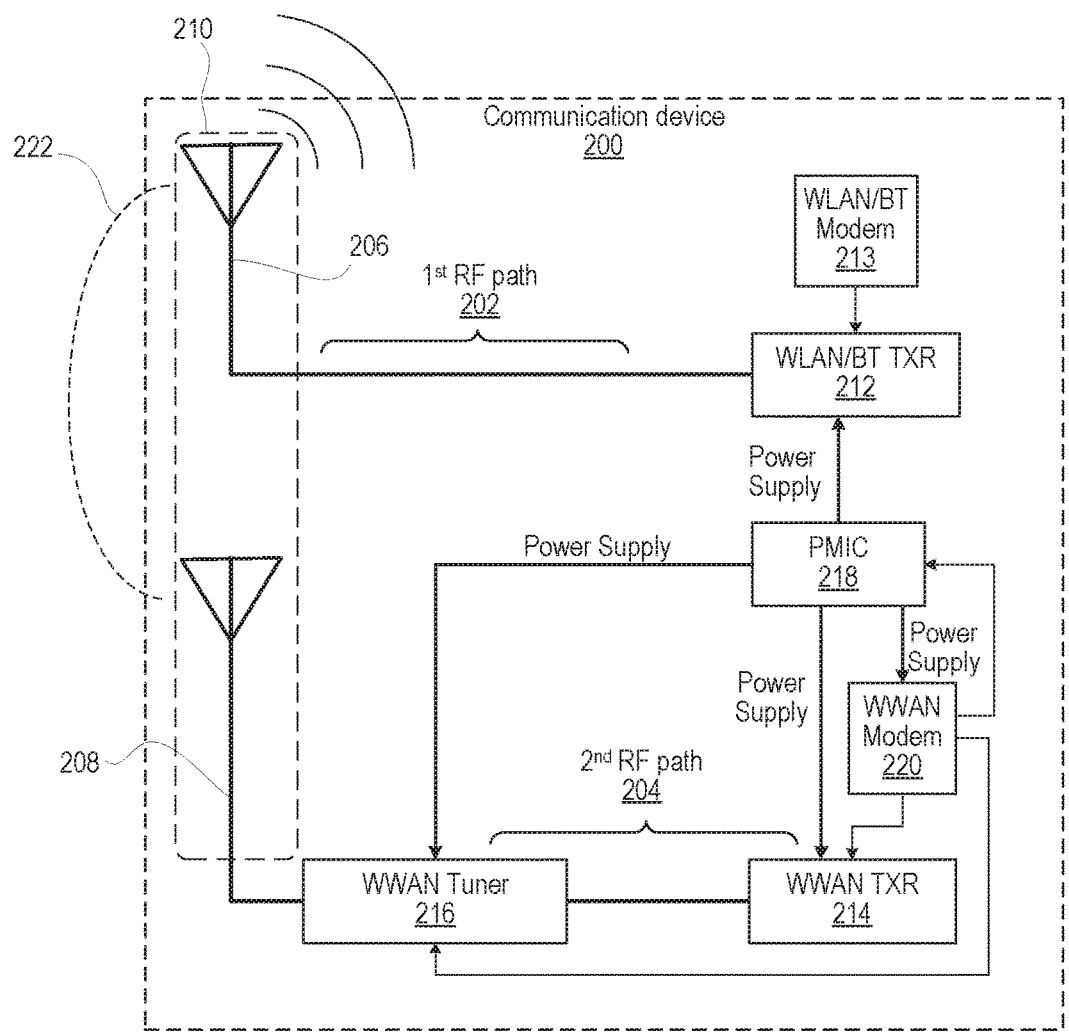
FIG. 2 illustrates a functional block diagram of a communication device having two radio frequency (RF) conduction paths with a selectively activated antenna tuner, according to one or more embodiments.

FIG. 2 illustrates a communication device 200 having a primary or first RF conduction path 202 and an independent secondary or second RF conduction path 204 that are generally independent from each other. However, in particular embodiments, an element on the second RF conduction path 204 degrades the performance of the first RF conduction path 202. First and second RF conduction paths 202, 204 have separate first and second antennas 206, 208 of a multiple band antenna system 210. A WLAN/BT transceiver (TXR) 212 transmits and receives over the first RF conduction path 202 that is modulated with information from a WLAN/BT modem 213. A WWAN TXR 214 transmits and receives over the second RF conduction path 204 with active impedance matching provided by a WWAN antenna tuner 216. A power supply, such as PMIC 218, selectively powers RF and Front End (FE) components with 2.7 V when scheduled for transceiving. For example, as an FE component, WWAN modem 220 can control PMIC 218, WWAN TXR 214, and WWAN antenna tuner 216. The tuner state of WWAN antenna tuner 216 cannot be optimized when the programming entity, WWAN modem 220, is asleep. In one or more embodiments, there is 1-3 dB loss performance impact on the first RF conduction path 202 when the WWAN tuner 216 is not active. In one or more embodiments, there is up to 3.5 dB or more loss performance impact on the first RF conduction path 202 when the WWAN tuner 216 is not active. The present innovation recognizes an opportunity for enhanced performance on the first RF conduction path 202 that is active by actively tuning the second RF conduction path 204 that is not active. The active tuning of the second RF conduction path 204 increases impedance and thus isolation of the second antenna 208 relative to the first antenna 206, due to electromagnetic coupling or resonance 222. The active tuning of the secondary RF conduction path 204 is discontinued when not helpful in order to reduce power consumption by the WWAN antenna tuner 216.

The WWAN antenna tuner 216 is made active when WLAN/BT TXR 212 is active and WWAN TXR 214 is in sleep mode. In one or more embodiments, WWAN antenna tuner 216 is programmed with proper WLAN/BT settings for the other antenna path (first RF conduction path 202) before putting WWAN modem 220 to sleep. If all affected signals are disabled (WWAN/WLAN/BT modems 213, 220 are idle/asleep), then PMIC 218 powers down the WWAN antenna tuner 216.

The optimal tuner state may be different for each signal (e.g. WLAN 2.4 GHz, WLAN 5.0 GHz, BT, GPS), but a compromised tuner setting that provides the greatest benefit may be selected. In one or more embodiments, this setting is programmed by the WWAN modem 220 prior to going to sleep when WWAN (second RF conduction path 204) is scheduled to be idle or is disabled. In one aspect, the present disclosure provides for selective antenna tuning to reduce the antenna tuner/RF-FE current drain once the WWAN modem 220 is asleep.

Alternatively, an optimal tuner state may be programmed by the WWAN modem 220 whenever one of the non-WWAN modems (WLAN/BT modem 212) is enabled or disabled. In this case, the WWAN modem 220 must be woken by the non-WWAN event, but the overhead is limited to these major events. Individual transmit (Tx) or receive (Rx) events (i.e. burst or packet behavior) are ignored by the WWAN modem 220. Even in this case, it is possible to gain reductions in current drain when the WWAN modem 220 is asleep using aspects of the present disclosure.

Figure 3:
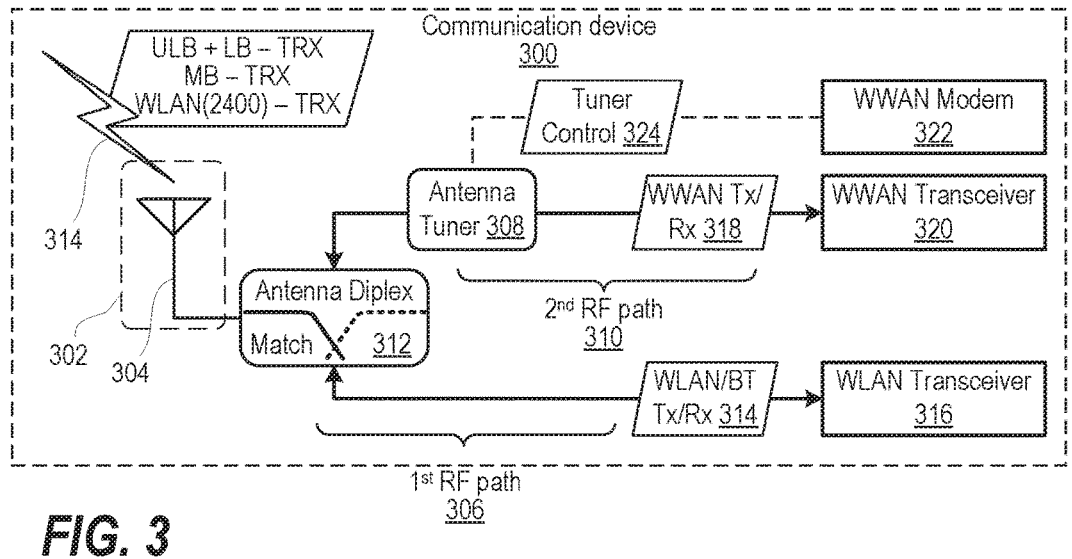
FIG. 3 illustrates a functional block diagram of a communication device having two RF conduction paths transceiving with one antenna and with a selectively activated antenna tuner, according to one or more embodiments.

FIG. 3 illustrates a communication device 300 having a multiple band RF antenna system 302 of one antenna 304. The communication device 300 incorporates a first RF conduction path 306 whose performance is indirectly enhanced by an antenna tuner 308 that actively tunes a second RF conduction path 310 that is inactive. A discrete diplexing antenna match 312 conducts a WLAN/BT Tx/Rx signal 314, such as a WLAN 2.4 GHz signal, to the tuned antenna 304. Antenna 304 is capable of ultra-low band (ULB), low band (LB), and mid-band (MB) transceiving 314. Although antenna tuner 308 is not in the first RF conduction path 306 of the WLAN/BT Tx/Rx signals 314 transceived by WLAN/BT transceiver 316, WLAN/BT performance of the antenna 304 is affected by the antenna tuner 308. Antenna tuner 314 directly tunes the second RF conduction path 310 that carries WWAN Tx/Rx signals 318 transceived by WWAN transceiver 320. The impact is significant enough (up to 3.5 dB) that it is desirable to keep the antenna tuner 308 active when WLAN/BT transceiver 316 is active and WWAN transceiver 320 is in sleep mode. WWAN modem 322 sends tuner control configuration settings 324 to adjust settings of the antenna tuner 308.

Figure 4:
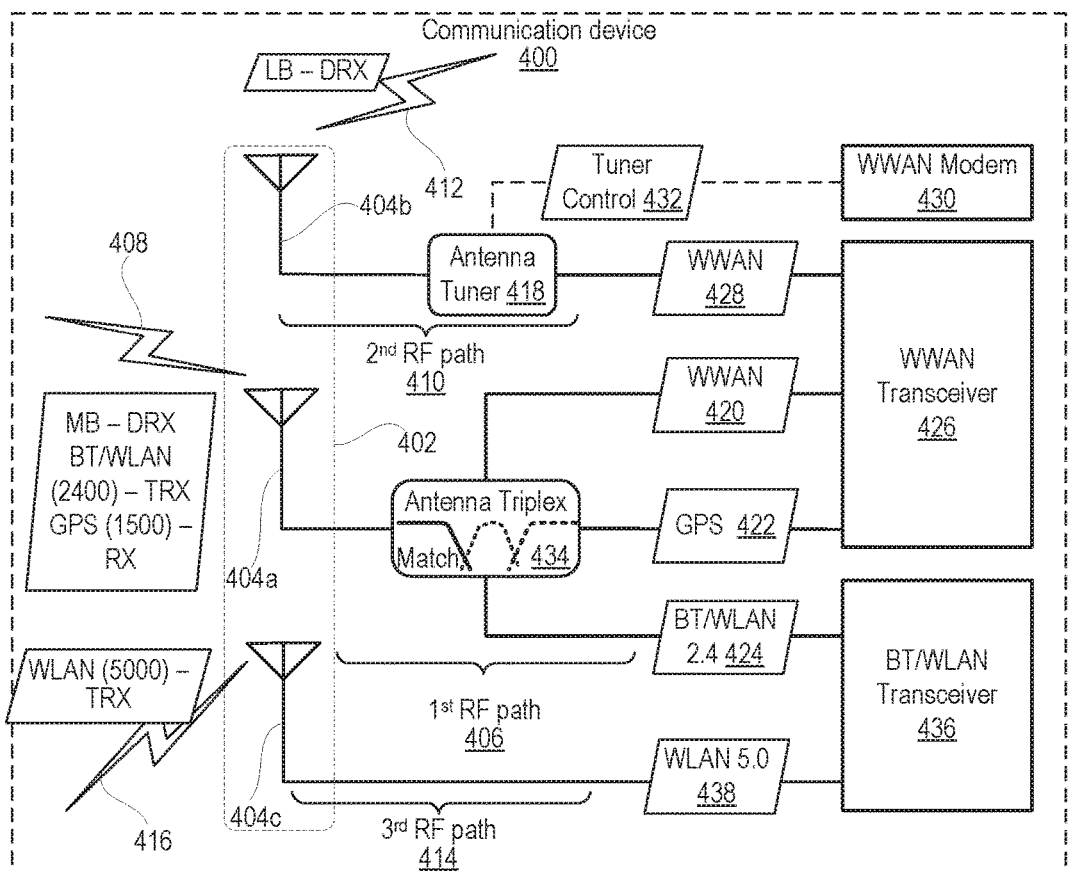
FIG. 4 illustrates a functional block diagram of a communication device having three RF conduction paths transceiving on respective antennas and with a selectively activated antenna tuner, according to one or more embodiments.

FIG. 4 illustrates a communication device 400 having a multiple band RF antenna system 402 of three antennas: (i) WWAN antenna 404a is coupled to a first RF conduction path 406 to dedicated receive (DRX) a low band signal 408; (ii) MB/BT/WLAN (2400)/GPS antenna 404b is coupled to a second RF conduction path 410 for MB DRX, BT/WLAN (2400) transceiving (TRX) 412, and GPS (1500) receiving (RX); and (iii) WLAN (5000) antenna 404c is coupled to a third RF conduction path 414 for WLAN (5000) TRX 416. Communication device 400 has an antenna tuner 418 on a different antenna 404b but can still provide a similar 1-3 dB performance impact to the WWAN antenna 404a. In this example, there is a benefit to keeping the antenna tuner 418 active whenever WWAN, GPS, or BT/WLAN (2400) 420, 422, 424 are active on the first RF conduction path 406. WWAN transceiver 426 receives a LB WWAN signal 428 over the second RF conduction path 410 from antenna 404b. WWAN modem 430 sends tuner control configuration settings 432 to the antenna tuner 418 to tune antenna 404b. WWAN transceiver 426 is coupled to the first RF conduction path 406 via a triplexer match 434 to antenna 404a for WWAN signal 420 and GPS signal 422. BT/WLAN transceiver 436 is coupled to the triplexer match 434 for transceiving the BT/WLAN (2400) signal 424 with antenna 404a. BT/WLAN transceiver 436 is coupled to the third RF conduction path 414 and third antenna 404c for transceiving WLAN (5000) signal 438.

In one implementation, the RF-FE components draw 350-650 μA from an analog 2.7 V power supply. If the current reduction techniques of the present disclosure are used, the current drain is nearly cut in half, which means that the WLAN has an average 0.8 mA and BT has an average of 0.6 mA in standby contribution.

In one embodiment, the antenna tuner and RF-FE current drain may be reduced while WLAN is searching for available networks. Preferred Network Offload (PNO) is a service within ANDROID devices that allows the communication or user device to search for and connect to WLAN networks, even while the screen is switched off. This results in reduced battery consumption and lower data usage. A user device with PNO activated, that is not connected to a WLAN network, and that is in sleep mode, will start querying with a saved service set identifier (SSID) in order to search the network periodically. When one known network router is found, the user device connects without waking up an application processor. The SSID is used as a name to identify a wireless router to connect to. Rather than waiting for a network node to announce itself, the user device can initiate the discovery by transmitting the query with the SSID. Power consumption in one sense is reduced because the querying can be done at the chosen timing of the user device rather than being awake listening to the network for an extended period. In addition, the user device can query a number of previously known networks looking for a known wireless router.

PNO scan periodicity is subject to change based on vendor implementation or carrier request. For example, when a user device not associated to any WLAN network and is in sleep mode, the user device can be configured to be more aggressive in order to search the SSID. Accordingly, the PNO scan periodicity may be increased. However, the improved connectivity with more frequent polling of probe request (PNO scan periodically) increases battery consumption, offsetting some of the advantages of using PNO rather than traditional network discovery. In other words, although PNO activated user device helps to reduce the overall battery consumption from a system perspective, the amount of power savings also depends on the periodicity level. Higher periodicity of PNO cycle relates to higher battery consumption. Current implementations of PNO periodicity include every 30 seconds for the first 2 minutes and then followed by every 1 minute afterwards until the user device wakes up or finds a network to be connected to. Another implementation includes PNO periodicity of every 45 seconds for the first 5 minutes, followed by every 8 min afterwards, until the user device wakes up or finds a network to be connected.

According to aspects of the present disclosure, the power supply can be aligned with the PNO scan frequency saving even more current drain. Since the user device is not associated with a network and PNO is activated, the WLAN transceiver can be deactivated, which overall brings more current drain saving. Based on this approach for WLAN, a reduction in the current drain of 96 to 99% is possible for the antenna tuner and associated RF-FE components sharing the 2.7V analog power supply.

Bluetooth Low Energy (BLE) also has periodicity if a BLE application is in use. The behavior is the same regardless of whether the display of the communication device is on or off. Such synchronized tuning and can have similar power saving. Similar to WLAN PNO, BLE wakes up at the interval of 1.28 sec and is active for 30 msec for the first 50 seconds and then drops to every 50 seconds periodicity. Thus, in between these periodicity intervals, the antenna tuner power supply can be disabled to save current drain. Based on this approach for BLE, a reduction in the current drain of 85 to 99% is possible for the antenna tuner and associated RF-FE components sharing the 2.7V analog power supply. In general, aspects of the present disclosure can be extended to any wireless technologies. The antenna tuner is woken up and turned on just in time before the need of the front end. Once the front end is done with the tasks, the antenna tuner is disabled for power savings.

Figure 5:
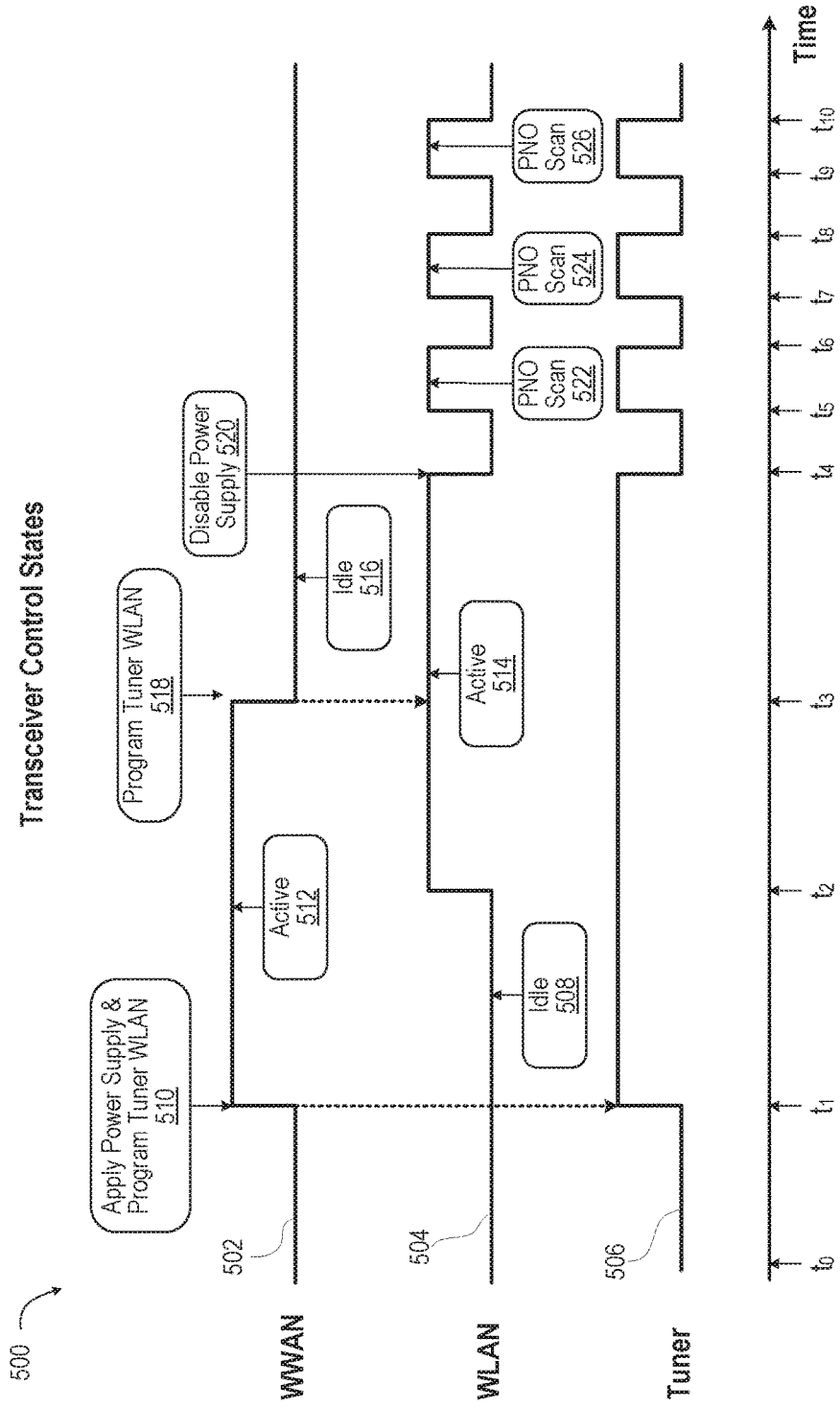
FIG. 5 illustrates a timing diagram of two RF conduction paths and a supporting antenna tuner that performs preferred network offload (PNO) searches, according to one or more embodiments.

FIG. 5 illustrates a timing diagram 500 of supporting PNO operation, including a WWAN transceiver state trace ("WWAN") 502, a WLAN transceiver state trace ("WLAN") 504, and an antenna tuner state trace ("Tuner") 506. At time $t_0$, WWAN 502, WLAN 504 and tuner 506 are all asleep. Immediately before time $t_1$ when WWAN 502 is scheduled to awake and WLAN 504 continues in idle state 508, power (2.7 V) is supplied to tuner 506. In addition, configuration data ("programming") can be applied to tuner 506 (block 510). Since WWAN 502 is in an active state 512, tuner 506 is active, directly enhancing the performance of an antenna that transceives WWAN signals. At time $t_2$, WWAN 502 remains active and is joined by WLAN going to active state 514. Antenna tuning can be based on optimizing transceiving of either of the WWAN or WWAM. For example, priority or Quality of Service (QoS) measurements may be used to optimize antenna tuning either for the directly or indirectly enhanced antennas. At time $t_3$, WWAN 502 switches to idle state 516 with WLAN 504 remaining in active state 514. Antenna tuner is programmed to indirectly enhance WLAN transceiving (block 518). At time $t_4$, WWAN 502 remains in idle state 516 and WLAN 504 switches to idle state 508. With no transceiving to directly or indirectly optimize, antenna tuner 506 is disabled to dynamically reduce current drain (block 520). At time $t_5$, WLAN 504 switches to active state 514 for PNO scan (block 522). Tuner 506 is enabled to indirectly optimize WLAN 506. At time $t_6$, WLAN 504 switches to idle state 508 having completed PNO state 522. With no transceiving to directly or indirectly optimize, antenna tuner 506 is disabled. At time $t_7$, WLAN 504 switches to active state 514 for PNO scan (block 524). Tuner 506 is enabled to indirectly optimize WLAN 506. At time $t_8$, WLAN 504 switches to idle state 508 having completed PNO state 520. With no transceiving to directly or indirectly optimize, antenna tuner 506 is disabled. At time $t_9$, WLAN 504 switches to active state 514 for PNO scan (block 526). Tuner 506 is enabled to indirectly optimize WLAN 506. At time $t_{10}$ WLAN 504 switches to idle state 508 having completed PNO state 524. With no transceiving to directly or indirectly optimize, antenna tuner 506 is disabled. The periodicity pattern can continue while the WWAN 502 is idle and WLAN remains in a PNO mode.

Figure 6:
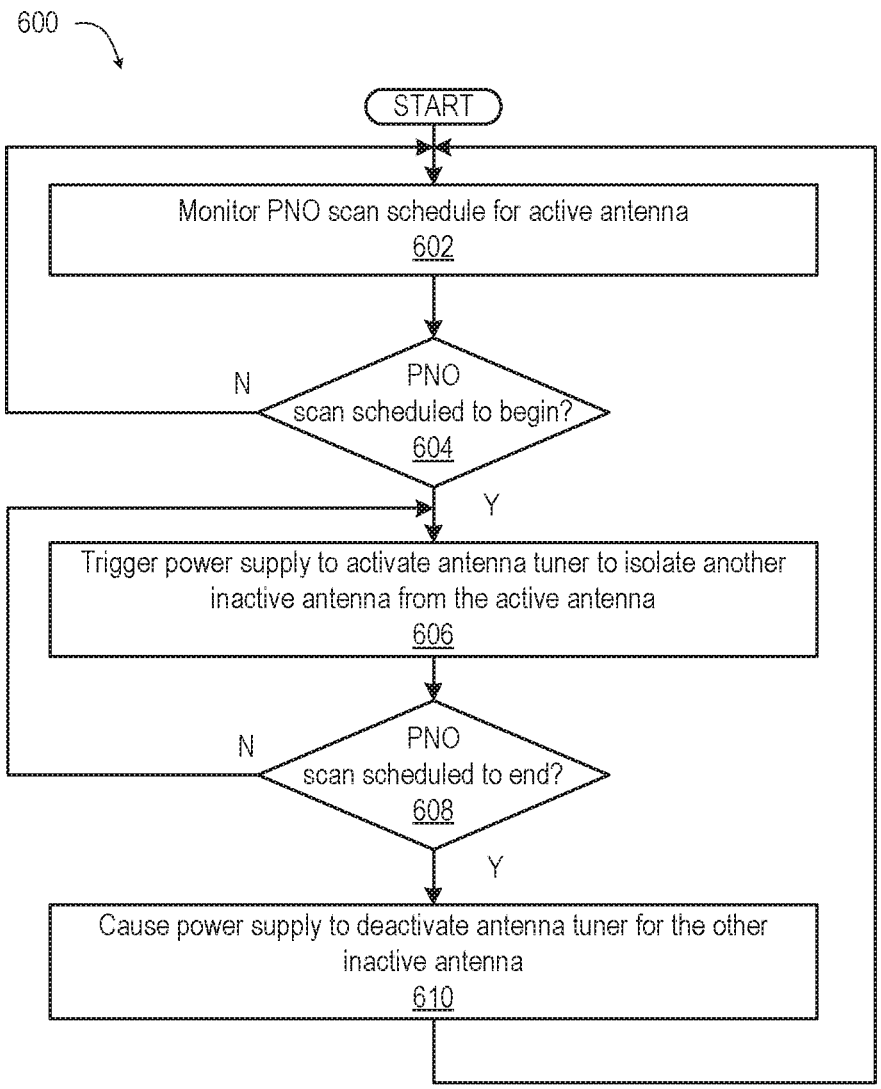
FIG. 6 illustrates a flow chart of a method of improving antenna performance with dynamic reduction in current drain during PNO operation, according to one or more embodiments.

FIG. 6 illustrates a method 600 of improving antenna performance with dynamic reduction in current drain during PNO operation. Method 600 begins with the device monitoring PNO scan schedule information for an active antenna (block 602). A determination is made whether a PNO scan is scheduled to begin (decision block 604). In response to determining that the PNO is not scheduled to begin, method 600 returns to block 602 to continue monitoring the PNO schedule. In response to determining that the PNO is scheduled to begin, method 600 triggers power supply to activate antenna tuner in order to isolate another inactive antenna from the active antenna (block 606). In one or more embodiments, the antenna tuner can switch from low power mode to active mode without new programming because the antenna tuner has memory. The memory can be nonvolatile memory or memory maintained by another digital power supply. Method 600 includes determining whether the PNO scan is scheduled to end (decision block 608). In response to determining that the PNO is not scheduled to end, method 600 returns to block 606 to continue tuning the inactive antenna. In response to determining that the PNO is scheduled to end, method 600 causes the power supply to deactivate the antenna tuner for the other inactive antenna to dynamically reduce current drain (block 610). Then method 600 returns to block 602 to continue monitoring PNO schedule.

Figure 7:
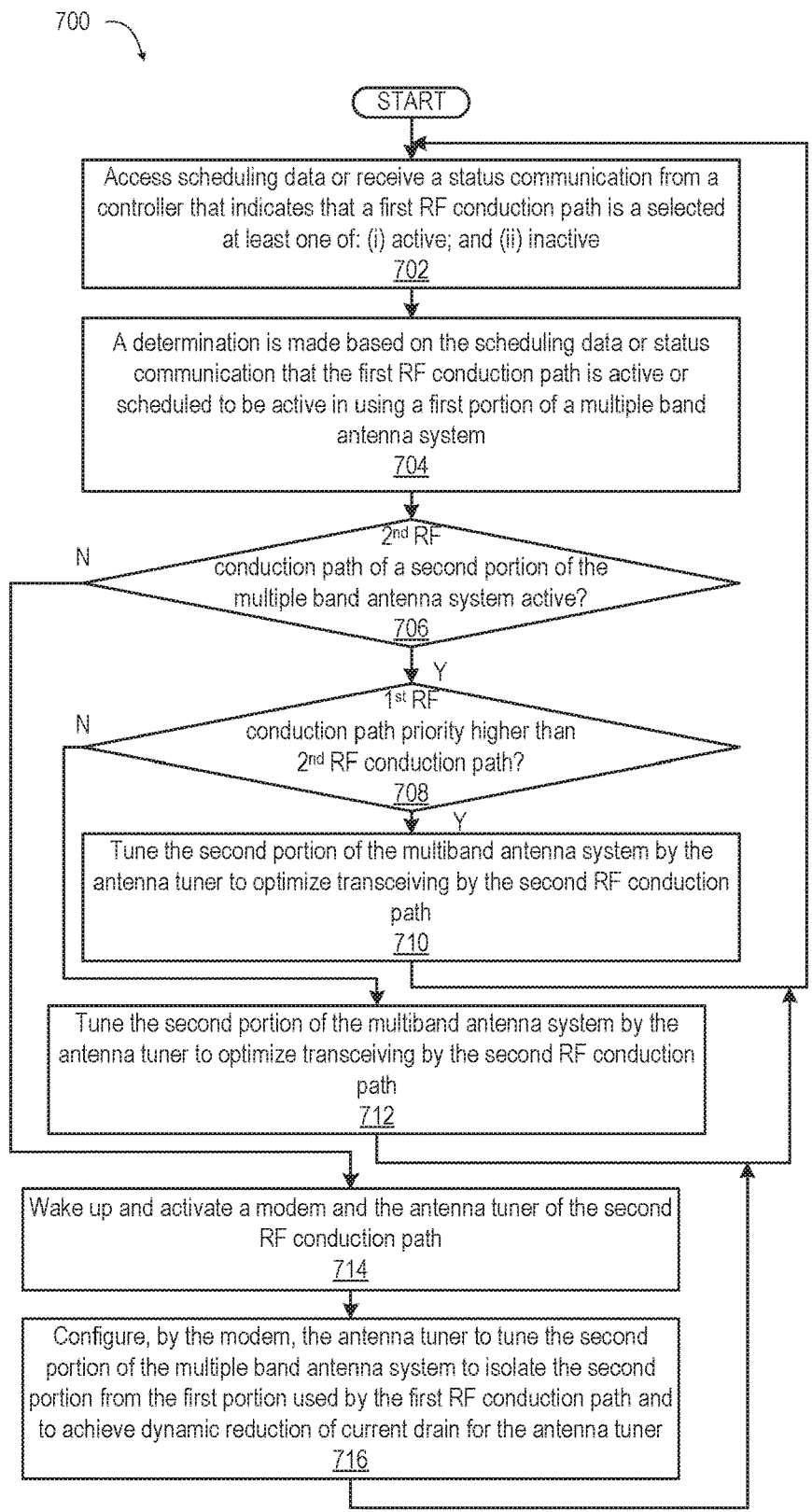
FIG. 7 illustrates a flow chart of a method of dynamic reduction in current drain for an antenna tuner that indirectly improves performance of another RF conduction path, according to one or more embodiments.

FIG. 7 illustrates a method 700 of dynamic reduction in current drain for an antenna tuner that indirectly improves performance of another RF conduction path. In one or more embodiments, method 700 begins with a programming subsystem of a communication device accessing scheduling data or receiving a status communication from a controller that indicates that a first RF conduction path is selected to at least one of: (i) active; and (ii) inactive (block 702). Based on the scheduling data or status communication, a determination is made that the first RF conduction path is active or scheduled to be active in using a first portion of a multiple band antenna system (block 704). In response to determining that the first RF conduction path is active, a determination is made whether a second RF conduction path of a second portion of the multiple band antenna system is active (decision block 706). In response to both the first and the second RF conductive paths being active, a determination is made whether the first RF conduction path has a higher priority for antenna gain than the second RF conduction path (decision block 708). In response to the first RF conduction path not having a higher priority, method 700 includes tuning the second portion of the multiband antenna system by the antenna tuner to optimize transceiving by the second RF conduction path (block 710). Then method 700 returns to block 702 to continue dynamically reducing current drain by the antenna tuner. In response to the first RF conduction path having a higher priority, method 700 includes tuning the first portion of the multiband antenna system by the antenna tuner to optimize transceiving by the first RF conduction path (block 712). Then method 700 returns to block 702 to continue dynamically reducing current drain by the antenna tuner.

In response to determining that the second RF conduction path of the second portion of the multiple band antenna system is inactive in decision block 706, method 700 includes waking up and activating a modem and the antenna tuner of the second RF conduction path (block 714). The modem configures the antenna tuner to tune the second portion of the multiple band antenna system to isolate the second portion from the first portion used by the first RF conduction path and to achieve dynamic reduction of current drain for the antenna tuner (block 716). Then method 700 returns to block 702 to continue dynamically reducing current drain by the antenna tuner.

Figure 8:
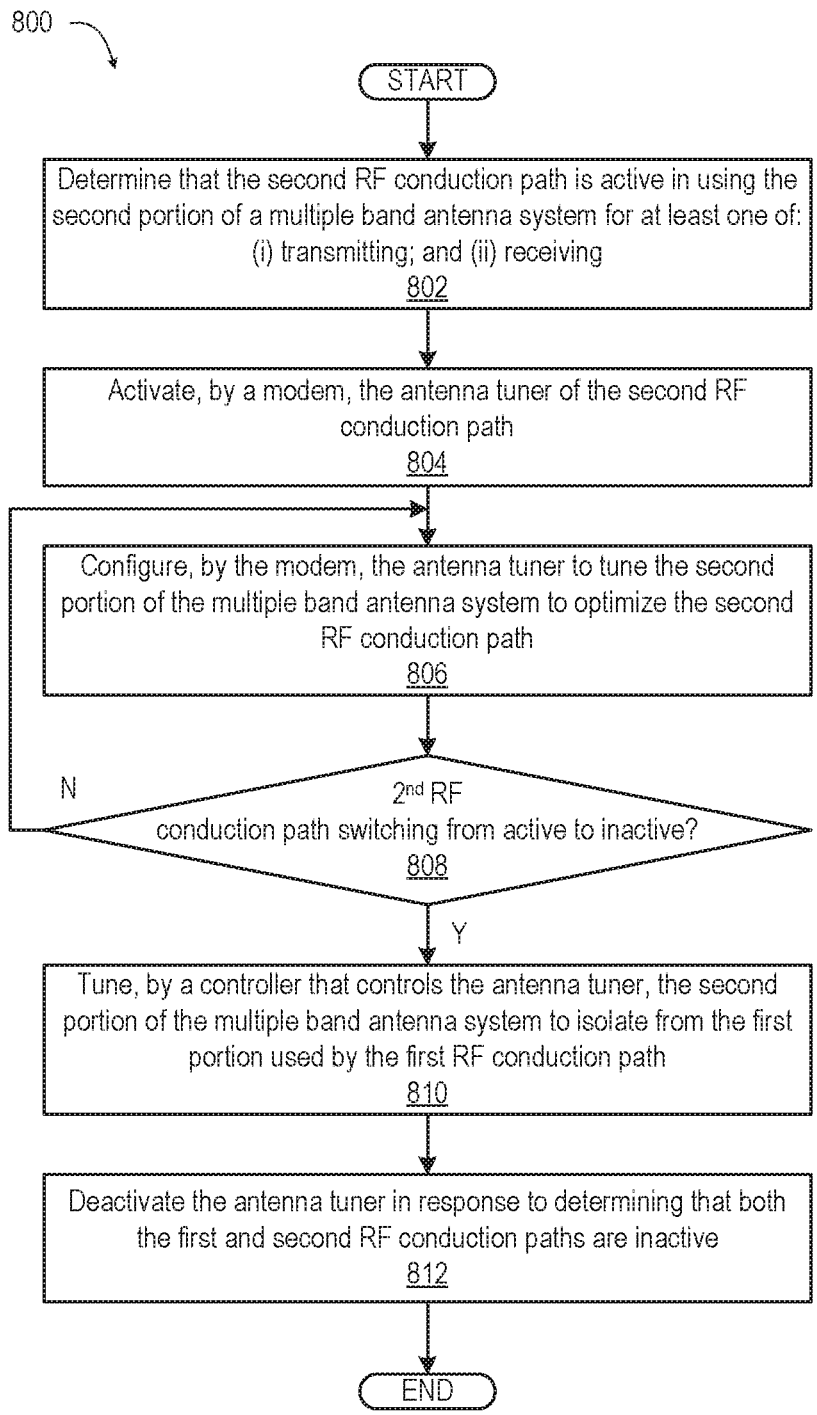
FIG. 8 illustrates a flow chart of a method of prospectively enhancing performance of another RF conduction path by an antenna tuner before going inactive, according to one or more embodiments.

FIG. 8 illustrates a method 800 of prospectively enhancing performance of another RF conduction path by an antenna tuner before going inactive. Method 800 includes the device determining that the second RF conduction path is active in using the second portion of a multiple band antenna system for at least one of: (i) transmitting; and (ii) receiving (decision block 802). In response to determining that the second RF conduction path is active, method 800 includes activating, by a modem, the antenna tuner of the second RF conduction path (block 804). Modem configures the antenna tuner to tune the second portion of the multiple band antenna system to optimize the second RF conduction path (block 806). Method 800 includes determining whether the second RF conduction path is switching from active to inactive (decision block 808). In response to determining that the RF conduction path is not switching from active to inactive, method 800 returns to block 806 to continue optimizing for the second RF conduction path. In response to determining that the RF conduction path is switching from active to inactive, method 800 includes tuning, by a controller that controls the antenna tuner, the second portion of the multiple band antenna system to isolate from the first portion used by the first RF conduction path (block 810). Method 800 includes deactivating the antenna tuner in response to determining that both the first and second RF conduction paths are inactive (block 812). Then method 800 ends.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
  determining that a first radio frequency (RF) conduction path is active in using a first portion of a multiple band antenna system for at least one of: (i) transmitting; and (ii) receiving a signal;
  in response to determining that a second RF conduction path is inactive and is thus not using a second portion of the multiple band antenna system:
    activating an antenna tuner of a second RF conduction path that uses the second portion of the multiple band antenna system; and
    configuring the antenna tuner to tune the second portion of the multiple band antenna system to isolate the second portion from the first portion used by the first RF conduction path and to achieve dynamic reduction of current drain by the antenna tuner.

2. The method of claim 1, further comprising deactivating the antenna tuner in response to determining that both the first and second RF conduction paths are inactive to achieve the dynamic reduction of current drain for the antenna tuner.

3. The method of claim 2, further comprising:
  determining whether the second RF conduction path is active;
  in response to both the first and the second RF conductive paths being active, determining whether the first RF conduction path has a higher priority for antenna gain than the second RF conduction path; and
  performing the activating and the configuring of the antenna tuner to tune the second portion of the multiple band antenna system in response to: (i) the second RF conduction path being active; and (ii) the first RF conduction path having the higher priority.

4. The method of claim 1, wherein determining whether the first RF conduction path is active comprises:
  accessing scheduling data for the first RF conduction path; and
  determining based on the scheduling data that the first RF conduction path is scheduled to be active starting a first time and is scheduled to switch to inactive at a second time.

5. The method of claim 1, wherein determining whether the first RF conduction path is active comprises:
  receiving, by a modem that controls the antenna tuner, a status communication that indicates a selected one of: (i) active; and (ii) inactive from a controller that is in communication with the first RF conduction path; and
  determining that the status communication indicates that the first RF conduction path is active.

6. The method of claim 1, wherein configuring the antenna tuner to tune the second portion of the multiple band antenna system further comprises:
  determining whether the second RF conduction path is active in using the second portion of a multiple band antenna system for at least one of: (i) transmitting; and (ii) receiving;
  in response to determining that the second RF conduction path is active:
    activating, by a controller, the antenna tuner of the second RF conduction path;
    configuring the antenna tuner to tune the second portion of the multiple band antenna system to optimize the second RF conduction path;
    determining whether the second RF conduction path is switching from active to inactive; and
    in response to determining that the RF conduction path is switching from active to inactive:
      tuning, by the controller that controls the antenna tuner, the second portion of the multiple band antenna system to isolate from the first portion used by the first RF conduction path; and
      deactivating the controller.

7. The method of claim 1, wherein configuring the antenna tuner to tune the second portion of the multiple band antenna system further comprises:
  waking up a modem and the antenna tuner of the second RF conduction path; and
  configuring, by the modem, the antenna tuner to tune the second portion of the multiple band antenna system when the first RF conduction path becomes active.

8. A communication device comprising:
  a multiple band antenna system;
  a first radio frequency (RF) conduction path coupled to a first portion of the multiple band antenna system and whose performance is indirectly enhanced by an antenna tuner that actively tunes a second RF conduction path that is active;
  a first transceiver coupled to the first RF conduction path to at least one of: (i) transmit; and (ii) receive a signal via the first portion of the multiple band antenna system;
  the second RF conduction path coupled to a second portion of the multiple band antenna system;
  a second transceiver coupled to the second RF conduction path to at least one of: (i) transmit; and (ii) receive a signal via the second portion of the multiple band antenna system;
  the antenna tuner coupled to the second RF conduction path to tune the second portion of the multiple band antenna system;
  a modem coupled to the antenna tuner to configure tuning of the second portion of the multiple band antenna system;
  a processor subsystem in communication with the modem and which executes an antenna tuning control utility, which causes the processor subsystem to:
    determine that the first RF conduction path is active in using the first portion of the multiple band antenna system for at least one of: (i) transmitting; and (ii) receiving the signal; and
    in response to determining that a second RF conduction path is inactive and is thus not using a second portion of the multiple band antenna system:
      activate the modem and the antenna tuner of the second RF conduction path that uses the second portion of the multiple band antenna system; and
      configure the antenna tuner, via the modem, to tune the second portion of the multiple band antenna system to isolate the second portion from the first portion used by the first RF conduction path and to achieve dynamic reduction of current drain by the antenna tuner.

9. The communication device of claim 8, wherein the processor subsystem deactivates the antenna tuner in response to determining that both the first and second RF conduction paths are inactive to achieve dynamic reduction of current drain for the antenna tuner.

10. The communication device of claim 9, wherein the processor subsystem:
   determines whether the second RF conduction path is active;
   in response to both the first and the second RF conduction paths being active, determines whether the first RF conduction path has a higher priority for antenna gain than the second RF conduction path; and
   configures the antenna tuner via the modem to tune the second portion of the multiple band antenna system further in response to: (i) the second RF conduction path being active; and (ii) the first RF conduction path having the higher priority.

11. The communication device of claim 8, wherein the processor subsystem determines whether the first RF conduction path is active based on scheduling data for the first RF conduction path.

12. The communication device of claim 8, further comprising a controller that is in communication with the first RF conduction path, wherein the processor subsystem:
   receives a status communication from the controller; and
   determines whether the first RF conduction path is active based on the status communication.

13. The communication device of claim 8, wherein the processor subsystem:
   determines whether the second RF conduction path is active in using the second portion of a multiple band antenna system for at least one of: (i) transmitting; and (ii) receiving;
   in response to determining that the second RF conduction path is active:
      activates the controller and the antenna tuner of the second RF conduction path via the power supply;
      configures the antenna tuner to tune the second portion of the multiple band antenna system to optimize the second RF conduction path;
   determines whether the second RF conduction path is switching from active to inactive; and
   in response to determining that the RF conduction path is switching from active to inactive:
      tunes, via the controller that controls the antenna tuner, the second portion of the multiple band antenna system to isolate from the first portion used by the first RF conduction path; and
      causes the power supply to deactivate the controller.

14. The communication device of claim 7, wherein the processor subsystem:
   causes the power supply to wake up a modem and the antenna tuner of the second RF conduction path; and
   configures the antenna tuner via the modem to tune the second portion of the multiple band antenna system when the first RF conduction path becomes active.

15. A computer program product comprising:
   a computer readable storage device; and
   program code on the computer readable storage device that when executed by a processor associated with a communication device, the program code enables the communication device to provide the functionality of:
      determining that a first radio frequency (RF) conduction path is active in using a first portion of a multiple band antenna system for at least one of: (i) transmitting; and (ii) receiving a signal; and
      activating an antenna tuner of a second RF conduction path that uses a second portion of the multiple band antenna system;
      configuring the antenna tuner to tune the second portion of the multiple band antenna system to isolate from the first portion used by the first RF conduction path and to achieve dynamic reduction of current drain for antenna tuner of a communication device; and
      deactivating the antenna tuner in response to determining that both the first and second RF conduction paths are inactive.

16. The computer program product of claim 15, further comprising:
   determining whether the second RF conduction path is active;
   determining whether the first RF conduction path has a higher priority for antenna gain than the second RF conduction path; and
   configuring the antenna tuner to tune the second portion of the multiple band antenna system further in response to: (i) the second RF conduction path being active; and (ii) the first RF conduction path having the higher priority.

17. The computer program product of claim 15, wherein determining whether the first RF conduction path is active comprises a selected one of: (i) accessing scheduling data for the first RF conduction path; and (ii) receiving, by a modem that controls the antenna tuner, a status communication from a controller that is in communication with the first RF conduction path.

18. The computer program product of claim 15, wherein configuring the antenna tuner to tune the second portion of the multiple band antenna system further comprises:
   determining whether the second RF conduction path is active in using the second portion of a multiple band antenna system for at least one of: (i) transmitting; and (ii) receiving;
   in response to determining that the second RF conduction path is active:
      activating, by a modem, the antenna tuner of the second RF conduction path;
      configuring the antenna tuner to tune the second portion of the multiple band antenna system to optimize the second RF conduction path;
   determining whether the second RF conduction path is switching from active to inactive; and
   in response to determining that the RF conduction path is switching from active to inactive:
      tuning, by a controller that controls the antenna tuner, the second portion of the multiple band antenna system to isolate from the first portion used by the first RF conduction path; and
      deactivating the modem and the antenna tuner.

19. The method of claim 1, wherein a performance of the first RF conduction path is indirectly enhanced by the antenna tuner that actively tunes the second RF conduction path that is inactive, and the method further comprises actively tuning the second RF conduction path to increase impedance and thus isolation of the second antenna relative to the first antenna due to electromagnetic coupling or resonance.

20. The communication device of claim 8, wherein a performance of the first RF conduction path is indirectly enhanced by the antenna tuner that actively tunes the second RF conduction path that is inactive, and the processor subsystem configures the modem to actively tune the second RF conduction path to increase impedance and thus isolation of the second antenna relative to the first antenna due to electromagnetic coupling or resonance.

* * * * *